Aug. 2, 1927.

K. MACKENZIE 1,637,620

NUT LOCKING DEVICE

Filed Nov. 24, 1926

Inventor
Kenneth Mackenzie
By Horatio E. Bellows
Attorney

Patented Aug. 2, 1927.

1,637,620

UNITED STATES PATENT OFFICE.

KENNETH MACKENZIE, OF TAUNTON, MASSACHUSETTS.

NUT-LOCKING DEVICE.

Application filed November 24, 1926. Serial No. 150,447.

My invention relates to devices adapted to maintain the nut from accidental disengagement from its bolt and is adapted primarily for use upon rails in conjunction with fish plates.

The essential objects of my invention are to prevent loosening of the nut from its bolt; to insure a constant and extreme pressure of the washer or locking plate against the fish plate, and the bolt head against the rail, when the bolt is employed in conjunction with rails; to prevent accidental circular movement of the locking plate or washer; to shield the bolt thread from mutilation or other injury; strength of construction; compactness; and to attain all these ends by means of a unit formed from a single piece of material with a minimum of labor and expense.

To the above ends essentially my invention consists in such parts and in such combinations of parts as fall within the scope of the appended claims.

Figure 1:
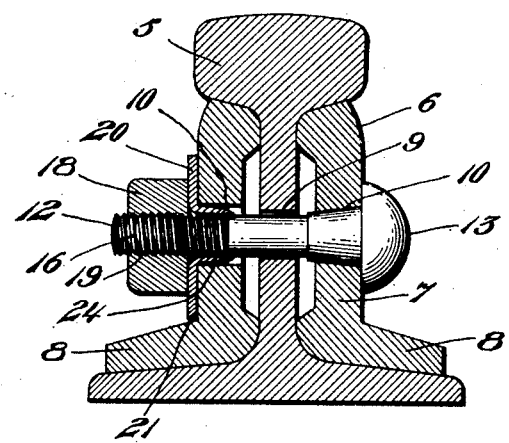
Figure 2:
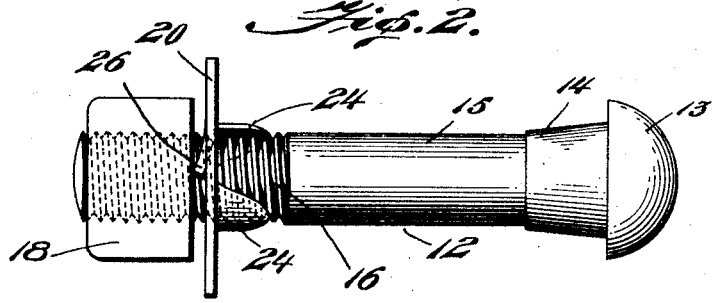
Figure 3:
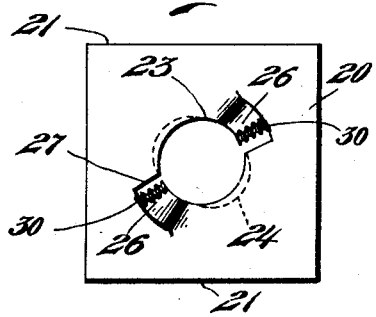
Figure 4:
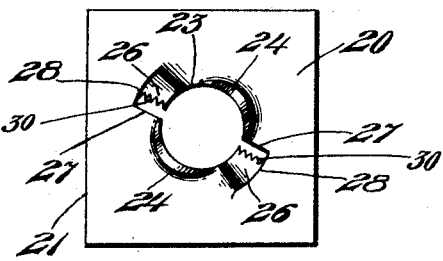

In the accompanying drawings which form a part of this specification,

Figure 1 is a transverse section of a rail and fish plates tightly engaged by my novel device, Figure 2, an enlarged side elevation of a bolt nut, and locking plate, loosely assembled and detached from a rail, and Figures 3 and 4, a front and rear elevation respectively of the locking plate or washer.

Like characters of reference indicate like parts throughout the views.

My locking device is herein shown applied to a rail 5 and fish plates 6, comprising bodies 7 and flanges or shoes 8. The rail and plates are provided respectively with openings 9 and 10 for the reception of a bolt 12 of any usual preferred construction. The bolt comprises a head 13, neck 14, and shank 15, the latter being provided at its end portion with the usual thread 16. A nut 18 has a thread 19 adapted to engage the thread 16 of the bolt upon which it is mounted.

A locking plate or washer 20 is provided having a plurality of plane edges 21, in this instance four in number. This plate is formed by suitable cutting and bending tools from a blank of relatively thin metal with a central bolt receiving hole 23 upon whose edge rearwardly extend, at right angles to the plate, spaced transversely curved bolt thread shields 24. The latter are disposed alternately with, or in staggered relation to inclined resilient lips 26 adapted to engage the inner face of the nut 18. Each lip is defined by the hole 23, a serrated slot 27 extending radially from the latter, and an arcuate slit 28 communicating with the slot 27 and conforming with the curvature of the hole. The free ends of the tongues 26 are outwardly bent and project forwardly from the front of the plate 20, rather than rearwardly from the back of the latter as do the shields 24, and have terminal serrations or teeth 30.

In operation the bolt 12 extends as usual through the openings 9 and 10 of the rail and fish plates. The plate 20 is placed against the face of one of the fish plates, the shields 24 registering in the opening 10 of the latter, and protecting the bolt thread 16 from mutilation or accidental contact with the wall of the surrounding opening 10. In thus applying the plate 20 one of its edges 21 engage or is adjacent the shoe 8 of the fish plate which prevents rotation of the plate 20, because the maximum radius of the plate 20 exceeds the distance between the opening 10 and shoe 8. The shields 24 are concentric with the opening 23 of the plate 20 thus as they are inserted in the opening 10 serve also to properly locate the edges of the plate 20 relatively to the shoe. Next the nut 19 is applied to the bolt, and before tightening assumes a position relatively to the lips 26 as that shown in Figure 2. When, however, the nut is finally set up the projecting ends of the lips will be forced back into approximately the plane of the plate 20.

It is important to note that by reason of the location of the lips 26 at the central portion of the plate 20 rather than at a substantial distance from the latter, they are wholly covered by the nut, and the latter is tightly locked by reason of the compression of the spring lips, rather than, as heretofore, by lips engaging the lateral faces of the nuts and serving merely as stops. The teeth 30 increase the grip of the spring lips upon the nut.

It is also important to note that not only are the shields 24 disposed at right angles with relation to the plate 20, rather than at an inclination thereto, but that the shields are oppositely directed from the lips 26. This adds to the compactness and efficiency of the plate 20.

Strength of construction as well as economy is afforded by the alternate arrangement of lips and shields.

I claim:—

1. In a nut lock, the combination with a bolt and a nut, of a locking plate provided with a hole to receive the bolt, an annular series of inclined resilient tongues integral with the plate abutting against the nut and wholly enclosed by the nut, and interspaced shields integral with the plate at the edge of the hole projecting in a direction away from the nut.

2. In a nut lock, the combination with a bolt and a nut, of a locking plate provided with a hole to receive the bolt, an annular series of inclined resilient tongues integral with the plate and provided with terminal serrations abutting against the nut and wholly enclosed by the nut, and interspaced shields integral with the plate at the edge of the hole at right angles to the plate projecting in a direction away from the nut.

3. In a nut lock, the combination with a bolt and nut, of a locking plate provided with a hole adapted to receive the bolt, a series of compressible tongues upon the plate bounding the hole and directed towards the nut and covered by the nut, and interspaced shields upon the plate disposed around the hole alternately with the tongues and directed away from the nut.

4. In a device of the character described, a rail, a fish plate comprising a body and shoe, said rail and body being provided with aligned openings, a bolt extending through the openings, a nut upon the bolt exterior of the fish plate, a polygonal locking plate intermediate the nut and the body of the fish plate and engaging the shoe of the fish plate and provided with a hole to receive the bolt, resilient tongues upon the locking plate bounding the hole engaging the nut, and shields integral with the locking plate around the hole extending in the opening in the fish plate.

In testimony whereof I have affixed my signature.

KENNETH MACKENZIE.